US009732553B2

(12) United States Patent
Rotchell

(10) Patent No.: US 9,732,553 B2
(45) Date of Patent: Aug. 15, 2017

(54) SHUTTER ASSEMBLY

(71) Applicant: Hunter Douglas Industries B.V., Rotterdam (NL)

(72) Inventor: Ken Rotchell, Rotterdam (NL)

(73) Assignee: HUNTER DOUGLAS INDUSTRIES B.V., Rotterdam (NL)

( * ) Notice: Subject to any disclaimer, the term of this patent is extended or adjusted under 35 U.S.C. 154(b) by 0 days.

(21) Appl. No.: 14/810,531

(22) Filed: Jul. 28, 2015

(65) Prior Publication Data
US 2016/0032642 A1 Feb. 4, 2016

(30) Foreign Application Priority Data
Jul. 31, 2014 (EP) .................................. 14179373

(51) Int. Cl.
*E06B 7/096* (2006.01)
*E06B 7/086* (2006.01)
*E06B 7/09* (2006.01)
*E06B 7/094* (2006.01)

(52) U.S. Cl.
CPC .............. *E06B 7/096* (2013.01); *E06B 7/086* (2013.01); *E06B 7/09* (2013.01); *E06B 7/094* (2013.01)

(58) Field of Classification Search
CPC ........................................................ E06B 7/096
USPC ................................ 49/74.1, 82.1, 77.1, 79.1
See application file for complete search history.

(56) References Cited

U.S. PATENT DOCUMENTS

| | | | | | |
|---|---|---|---|---|---|
| 84,913 | A | * | 12/1868 | Sherman | 49/74.1 |
| 283,941 | A | * | 8/1883 | Williams | 160/174 R |
| 518,368 | A | * | 4/1894 | Jobin | 49/74.1 |
| 708,618 | A | * | 9/1902 | Briggs | 49/87.1 |
| 734,603 | A | * | 7/1903 | Plucker | 49/77.1 |
| 1,283,338 | A | * | 10/1918 | Simon | 52/64 |
| 2,225,332 | A | * | 12/1940 | Collins | 49/82.1 |
| 2,554,822 | A | | 5/1951 | Geier | |
| 2,955,815 | A | * | 10/1960 | Muhr | 49/64 |
| 3,120,035 | A | * | 2/1964 | Morris | 49/77.1 |
| 3,468,058 | A | * | 9/1969 | Fontaine | 49/74.1 |
| 3,919,814 | A | * | 11/1975 | Beretta et al. | 49/74.1 |
| 3,991,518 | A | * | 11/1976 | Ishihara | 49/74.1 |
| 4,128,307 | A | * | 12/1978 | Badertscher et al. | 359/596 |
| 4,313,650 | A | * | 2/1982 | Ward et al. | 359/596 |
| 4,449,563 | A | * | 5/1984 | Toda et al. | 160/184 |
| 4,576,088 | A | | 3/1986 | Mathewes et al. | |
| 4,999,948 | A | | 3/1991 | Hodgens | |
| 5,873,202 | A | * | 2/1999 | Parks | 52/73 |
| 7,866,737 | B2 | * | 1/2011 | Browne et al. | 296/193.1 |
| 8,695,281 | B2 | * | 4/2014 | Dondurur et al. | 52/3 |

(Continued)

FOREIGN PATENT DOCUMENTS

| | | |
|---|---|---|
| CN | 2723653 Y | 9/2005 |
| CN | 201972562 U | 9/2011 |

(Continued)

*Primary Examiner* — Jerry Redman
(74) *Attorney, Agent, or Firm* — Dority & Manning, P.A.

(57) ABSTRACT

A shutter assembly including a plurality of shutter panels arranged side-by-side. Each shutter panel has a respective plurality of louvers and a respective operable tilt mechanism configured to adjust the tilt angle of the respective plurality of louvers. A control shaft operates the tilt mechanisms. The control shaft is configured to drive simultaneously the respective tilt mechanisms of all of the plurality of shutter panels.

23 Claims, 8 Drawing Sheets

(56) References Cited

U.S. PATENT DOCUMENTS

| | | | |
|---|---|---|---|
| 8,973,305 B2* | 3/2015 | Zalesak | 49/74.1 |
| 2003/0159355 A1 | 8/2003 | Froerer et al. | |
| 2005/0252086 A1* | 11/2005 | Yorgason | 49/82.1 |
| 2005/0257429 A1* | 11/2005 | Yorgason | 49/82.1 |
| 2008/0120910 A1* | 5/2008 | Chen | 49/82.1 |
| 2008/0244979 A1* | 10/2008 | Huang et al. | 49/82.1 |

FOREIGN PATENT DOCUMENTS

| | | | |
|---|---|---|---|
| DE | 19726398 A1 | 1/1999 | |
| DE | 10062707 A1 | 1/2002 | |
| JP | 52030039 A * | 3/1977 | E06B 9/01 |
| WO | 02/33208 A1 | 4/2002 | |

\* cited by examiner

SHUTTER ASSEMBLY

CROSS-REFERENCE TO RELATED APPLICATION

This application is claims priority to European Patent Application No. 14179373.7, filed Jul. 31, 2014, entitled "Shutter Assembly", which is hereby incorporated by reference herein in its entirety for all purposes.

TECHNICAL FIELD

The present invention relates to a shutter assembly, in particular having a plurality of shutter panels arranged side-by-side with each shutter panel including a set of adjustable louvers, and a method of adjusting the tilt angle of respective sets of louvers in respective shutter panels of a shutter assembly.

BACKGROUND

It is known from the prior art to provide a plurality of shutter panels, each shutter panel having a set of louvers for which the tilt angle may be adjusted. US 2003/0159355 A describes an automatic louver actuating system including a plurality of louvered panels and a respective plurality of motors installed in those panels for controlling tilt of respective sets of louvers.

Motorising the louvered panels in this way is expensive, the weight of each panel is increased and available space for the louvers within the panel is reduced.

SUMMARY

It is an object of the present invention at least to reduce the problems associated with the previous motorised louvered panels.

According to the present invention, there is provided a method of adjusting the tilt angle of respective sets of louvers in respective shutter panels of a shutter assembly including operating a control shaft to drive simultaneously all of the respective tilt mechanisms of all of the plurality of shutter panels. When one or more sets of louvers are out of relative orientation with the single control shaft, because of one or both of them having been manually tilted or having been pivoted away from the control shaft with opening of the respective shutter panel, the method may include operating the control shaft between its two opposite ends of operation so as to relocate with any respective tilt mechanisms that have become out of relative orientation.

According to the present invention, there is provided a shutter assembly including a plurality of shutter panels arranged side-by-side, each shutter panel having a respective plurality of louvers and a respective operable tilt mechanism configured to adjust the tilt angle of the respective plurality of louvers. A control shaft may be provided for operating the tilt mechanisms. The control shaft may be configured to drive simultaneously all of the respective tilt mechanisms of all of the plurality of shutter panels.

In this way, the shutter panels themselves need not contain a motor. Instead, each tilt mechanism of a respective shutter panel is driven by the control shaft, the control shaft being shared by all of the plurality of shutter panels and being provided to drive all of the tilt mechanisms of the shutter panels. Because the individual shutter panels need not contain a respective motor, the weight of an individual shutter panel may be reduced. Similarly, space is not required within the shutter panel for a motor such that more of the area of the shutter panel may be taken up by the tiltable louvers.

Each shutter panel is a respective self-supporting structure. It includes the tilt mechanism and pivotable support for all of its louvers. It may include at least one edge member for partially or completely surrounding its louvers. The control shaft is provided externally of and separate to the plurality of shutter panels and may extend adjacent to all of the shutter panels and beside each of the shutter panels in their side-by-side arrangement.

With the plurality of shutter panels arranged side-by-side, the control shaft may extend either along the top or along the bottom of the side-by-side arrangement, thereby extending along the tops or bottoms of each of the plurality of shutter panels. The control shaft may preferably be rotatable about its own axis. The louvers may tilt/rotate about axes extending in the side-by-side direction substantially parallel with the control shaft.

The shutter assembly may further include a plurality of respective actuators for the plurality of respective shutter panels. Each respective actuator may be configured to engage with a respective tilt mechanism. Each respective actuator may also be operable by the control shaft to drive the respective tilt mechanism of the respective actuator.

In this way, although a single control shaft is provided for operating all of the tilt mechanisms of the plurality of shutter panels, individual respective actuators, each operable by the control shaft, may be provided to drive the respective tilt mechanisms of the plurality of shutter panels.

The shutter assembly may further include a respective gear mechanism for each respective shutter panel for converting rotational movement of the control shaft to translation of a respective actuator.

Translation of an actuator, in other words movement in a longitudinal or lateral direction, may be used to operate a respective tilt mechanism so as to tilt the plurality of louvers of the respective shutter panel.

Each respective actuator may extend towards the respective shutter panel. Each respective actuator may be configured to translate parallel to a plane defined by the respective shutter panel and thereby drive the respective tilt mechanism.

Each respective tilt mechanism of each respective shutter panel may include a respective tab which extends towards a respective actuator. The tab is provided for engagement with a respective actuator and is operable by the respective actuator to drive the respective tilt mechanism.

The shutter assembly may further include a frame supporting the plurality of shutter panels. In this case, the actuators may be provided extending from the frame towards the respective shutter panels.

The control shaft may extend within a portion of the frame, for instance at the top or bottom of the side-by-side arrangement of the shutter panels. Also, the plurality of respective gear mechanisms, if provided, may be provided within that portion of the frame.

Thus, a plurality of respective actuators, operable by the control shaft, may be provided extending to each of the respective shutter panels to operate the respective tilt mechanisms. Each actuator may translate parallel to a plane defined by the respective shutter panel, namely the plane of the frame when a frame is provided for the plurality of shutter panels. In one arrangement, the actuator may translate towards and away from a respective shutter panel along its own length substantially perpendicular to the side-by-side arrangement and the axes of rotation of the louvers. Each actuator may engage with a respective tab provided on a tilt mechanism for operating that respective tilt mechanism.

Although the control shaft enables simultaneous operation of all respective tilt mechanisms, it may be desirable for a user to change manually the tilt angle of the set of respective louvers of a respective shutter panel.

In this respect, the shutter assembly may further include a plurality of respective clutches formed between the respective tilt mechanisms and the control shaft. Each respective clutch may provide engagement or allow selective relative slip between a respective tilt mechanism and the control shaft. In one embodiment, respective clutches selectively provide output from the control shaft to respective shutter panels. The clutches may provide engagement between the control shaft and the tilt mechanism until a breakaway resistance has been overcome or may selectively provide engagement. In one arrangement, the clutches may be provided as electromagnetic clutches for selectively providing engagement. Where the control shaft is driven by a motor, the respective clutches can be configured to provide engagement when the motor is operated.

Where respective actuators, as defined above, are provided in the shutter assembly, the clutches may be provided respectively between the control shaft and the actuators, for example between the control shaft and respective gears for operating the respective actuators. Alternatively, the clutches may be formed respectively between the actuators and their respective tilt mechanisms. The respective clutches may thus form respective engagements between the respective tilt mechanisms and the respective actuators.

In this way, a user may manually/directly adjust the tilt angle of a respective plurality of louvers during engagement of the clutches or by forcing movement of the tilt mechanism against the resistance of the respective clutch so that the respective tilt mechanism operates/moves relative to the control shaft.

The clutches may provide a breakaway resistance at all respective relational positions between the tilt mechanism and the control shaft. Alternatively, a clutch may provide substantially no breakaway resistance at any relational position other than one particular relational position. Thus, when the position of the control shaft and the state of a respective tilt mechanism for a particular tilt angle has a predetermined relationship, then the clutch engages the control shaft with the respective tilt mechanism up to a breakaway resistance. Providing a force to the louvers to overcome the breakaway resistance allows the respective tilt mechanism and the tilt of the louvers to change relative to the control shaft and then freely move.

Each respective clutch may include a mechanical engagement. Additionally or alternatively, each respective clutch may include a magnetic engagement. The engagement may alternatively be electromagnetic and be controlled to selectively allow slip.

Respective clutches may be provided between respective actuators and respective tilt mechanisms, selectively connecting actuators to respective tilt mechanisms. Respective clutches may also or alternatively be provided at the output of the control shaft between the control shaft and the respective actuators.

Where respective actuators are provided for respective shutter panels and those actuators operate respective tilt mechanisms by translating towards and away from a respective shutter panel substantially perpendicular to the axes of the louvers, each respective actuator may include one of a recess or a protrusion for engaging with a mating protrusion or recess respectively in a portion of the respective tilt mechanism. Where the tilt mechanism is provided with a tab, the mating respective protrusion or recess may be provided by that tab. This arrangement is useful for when the tilt mechanism, with its respective shutter panel, pivots away from its frame or architectural support. The tilt mechanism and actuator easily disengage and can re-engage when the shutter panel is swung shut again.

During operation of the shutter assembly, by operating the control shaft between two opposite limits for opposite tilts of the plurality of louvers, it is possible to ensure that any disengaged mating protrusions and recesses are reengaged so that, once again, the control shaft can operate the respective tilt mechanisms and louvers.

While the mating protrusion and recess are engaged with one another, translation of the actuator under control of the control shaft will operate the respective tilt mechanism. However, manual direct operation of the louvers and the respective tilt mechanism can be used to overcome the breakaway resistance of the mated protrusion and recess so that the protrusion and recess become disengaged from one another, thereby allowing the respective plurality of louvers and tilt mechanism to operate independently of movement of the control shaft. Alternatively, if clutches are provided at the output of the control shaft, the protrusions and recesses may remain engaged whilst manual operation is achieved by slip of the respective clutches.

One or both of the respective protrusion and recess may be a magnetic component. This improves positive engagement between the protrusion and recess.

At least one shutter panel of the plurality of shutter panels may be pivotably supported. Where the shutter assembly includes a frame for supporting the plurality of shutter panels, that at least one shutter panel may be pivotably supported by the frame. The at least one shutter panel may be pivotable, with respect to the frame where appropriate, from a closed position in which the at least one shutter panel defines a plane and an open position with the at least one shutter at least partially extending from the plane. Where the shutter panels are supported by a frame, the plane will also be the plane of the frame.

Preferably, when the at least one shutter is in a position pivoted from the closed position, the respective tilt mechanism of the at least one shutter panel is pivoted away from the control shaft so that the respective tilt mechanism of the at least one shutter panel and the control shaft are disengaged.

In this way, the control shaft and any associated components need only be configured to operate louvers of shutter panels which are in their closed positions within the plane of the frame.

Where a plurality of respective actuators are provided, when the at least one shutter is in a position pivoted from the closed position, the respective tilt mechanism of the at least one shutter panel is preferably pivoted away from the respective actuator so that the respective tilt mechanism of the at least one shutter panel and the respective actuator are disengaged.

Engagement between a respective tilt mechanism and the respective actuator may be provided by the means as explained above. In other words, when a shutter panel is in the closed position, the clutch may be engaged by the respective actuator engaging with the respective tilt mechanism, for example its tab. Pivoting the shutter panel away from its closed position preferably results in the tilt mechanism, for example its tab, pivoting away from the actuator and, hence, becoming disengaged. For example, the respective mating protrusion and recess are moved apart in the direction in which the protrusion protrudes into the recess and there is no need to overcome the breakaway resistance.

In addition or alternatively, each respective shutter panel may be provided with a respective connector for operably connecting drive of the control shaft to the respective tilt mechanism when the shutter panel is in the closed position and to disconnect drive of the control shaft to the respective tilt mechanism when the respective shutter panel is in a position pivoted away from the closed position.

Each respective connector may be constructed similarly to the clutch described above and may include one or both of a mechanical engagement and a magnetic engagement.

Although the control shaft could be operated manually, the shutter assembly may include a motor configured to rotate the control shaft. The motor may be provided within a portion of the frame, for example in the same portion as that in which the control shaft is provided.

Each louver may be tiltable about a respective longitudinal axis extending longitudinally along the louver and the louvers of a respective plurality of louvers may be arranged in a side-by-side array with the respective longitudinal axes parallel. The side-by-side array of louvers may be perpendicular to the side-by-side arrangement of the shutter panels.

Each louver may include, at one longitudinal end of the louver, a louver gear rotatable with the louver and rotatable about the respective longitudinal axis of the louver for tilting the louver. Each respective tilt mechanism may include a rack bar extending substantially perpendicular to the louvers of a respective plurality of louvers and engaging with the respective louver gears of the respective plurality of louvers such that the louvers of the respective plurality of louvers tilt together.

The tab, where provided, may be provided on or as an extension of the rack bar.

Each respective shutter panel of the plurality of shutter panels may include a respective edge member. The respective tilt mechanism of the respective shutter panel may be housed within the respective edge member.

The tab, where provided, may extend through and protrude from a face of the respective edge member, for example for selective engagement with a corresponding respective actuator.

BRIEF DESCRIPTION OF THE FIGURES

The invention will be more clearly understood from the following description, given by way of example only, with reference to the accompanying drawings, in which.

DETAILED DESCRIPTION

A shutter assembly can be constructed with a plurality of shutter panels, each shutter panel having a plurality of slats or louvers mounted in stiles of the shutter panel.

Figure 1:
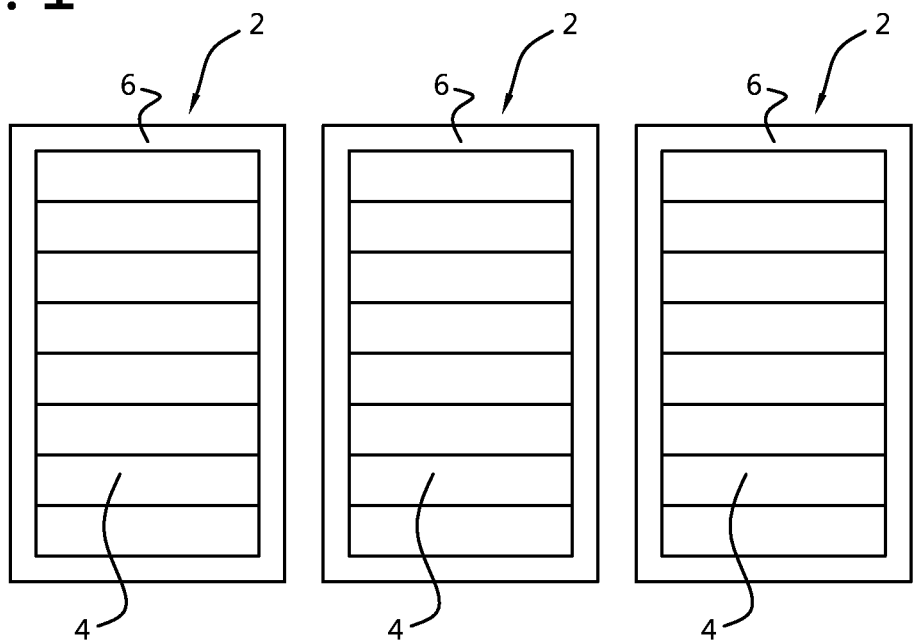
FIG. 1 illustrates an array of shutter panels.

FIG. 1 illustrates three such shutter panels 2 arranged side-by-side. Each shutter panel 2 includes a respective plurality of louvers 4 and respective edge members 6 forming stiles for supporting the louvers 4. As illustrated, the louvers 4 have a longitudinal extent in a horizontal direction and are arranged as a side-by-side array in a vertical direction. Thus, in the illustrated arrangement, the respective side-by-side arrays of louvers 4 are perpendicular to the side-by-side arrangement of shutter panels 2. The louvers 4 are pivotable about longitudinally extending axes so as to open or close respective shutter panels.

Figure 2:
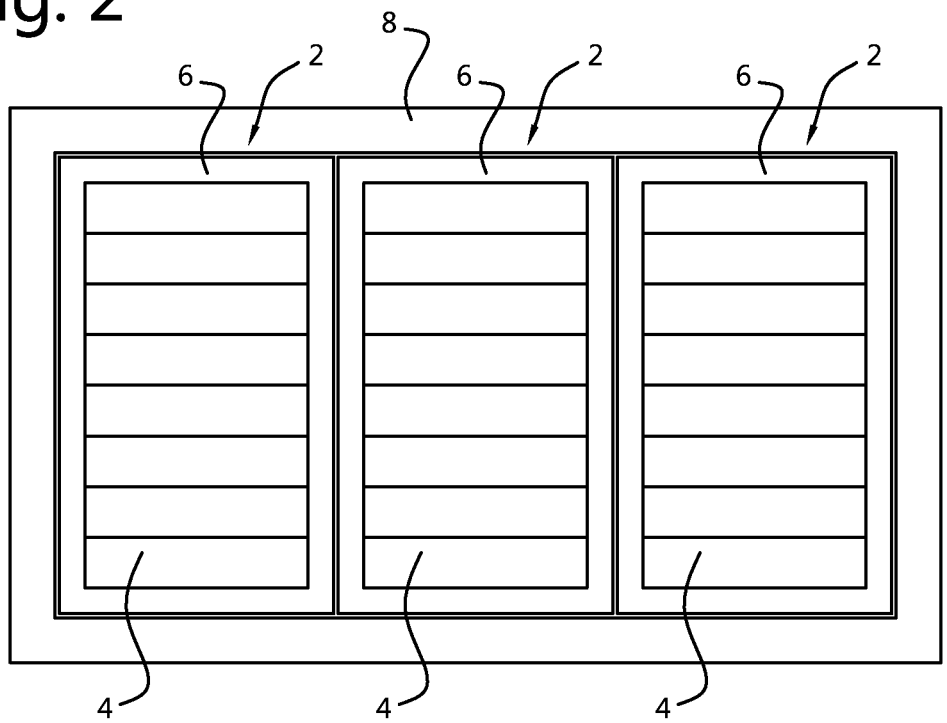
FIG. 2 illustrates an array of shutter panels in a frame.

The shutter panels 2 may be individually mounted adjacent to one another in an architectural opening or may be provided within a frame 8 as illustrated in FIG. 2.

So that all of the slats or louvers 4 of a respective shutter panel 2 operate/tilt together/simultaneously, a tilt rod may be provided to connect together all of the louvers 4 of a respective shutter panel 2. Such a tilt rod may be provided centrally with respect to the longitudinal extent of the louvers 4 or offset to one side. This type of tilt mechanism may also be provided hidden from view, for example behind the louvers, whereby a user manually operates the plurality of louvers 4 of a shutter panel 2 by manually adjusting one of the louvers 4 (and thereby adjusting the tilt of all of the louvers 4 for that respective shutter panel 2). The tilt mechanism may be hidden inside the edge member or stile of the shutter panel 2. One such tilt mechanism is described in US 2005/0252086.

Figure 3:
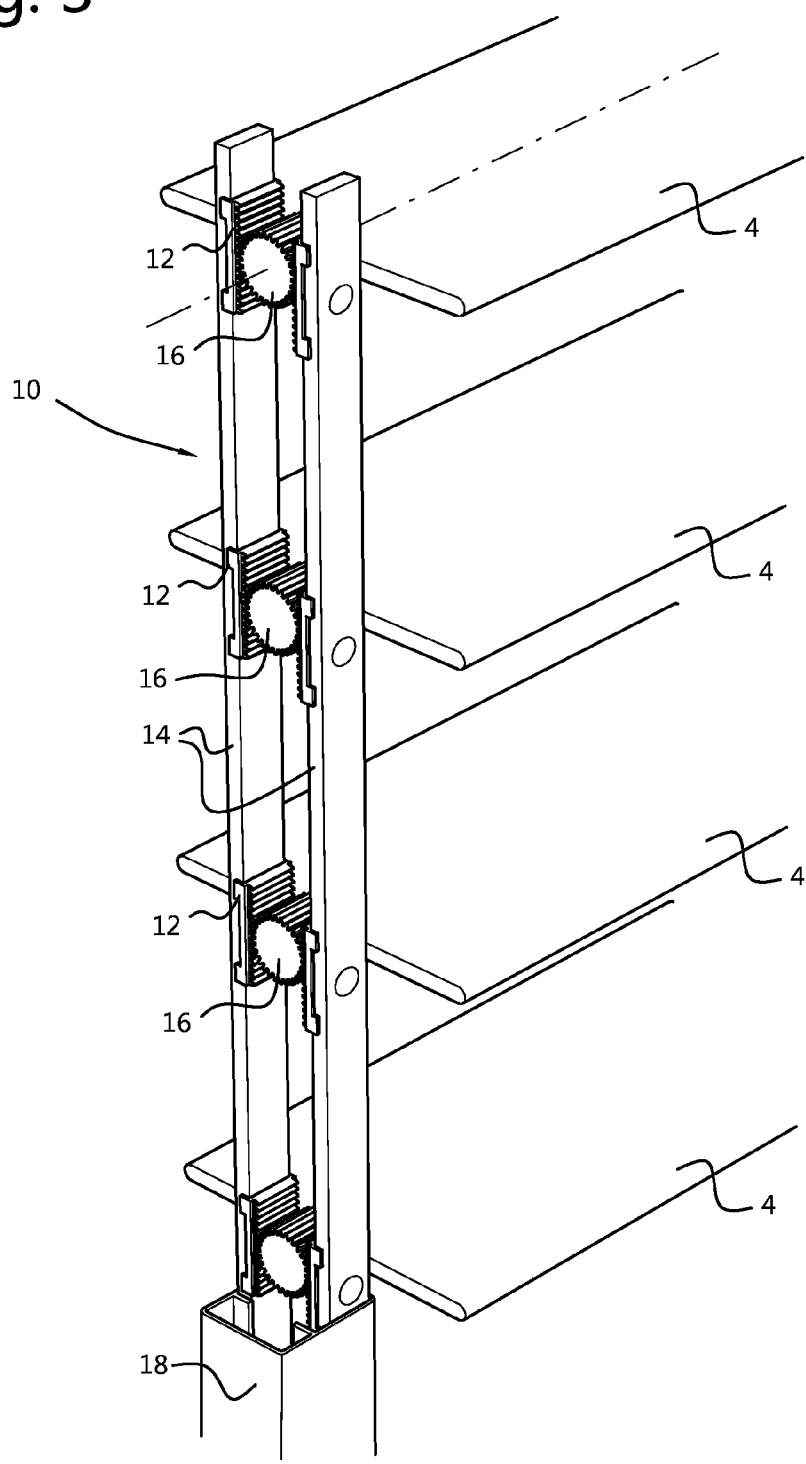
FIG. 3 illustrates a tilt mechanism for a shutter panel.

FIG. 3 illustrates an appropriate tilt mechanism 10. Rack gear portions 12 are provided at appropriate intervals along opposing respective rack bars 14. At one longitudinal end of each respective louver 4, a respective louver gear 16 is rotatable with the louver 4. In other words, by rotating a louvered gear 16 by a certain angle, the corresponding respective louver 4 will be tilted by that same angle. At least one of the two rack bars 14 is moveable/translatable along its length so as to rotate simultaneously all of the louver gears 16 and, hence, tilt all of the corresponding louvers 4. As illustrated, the tilt mechanism 10 can be housed within a stile 18 forming an edge member 6 supporting the corresponding respective plurality of louvers 4.

Figure 4:
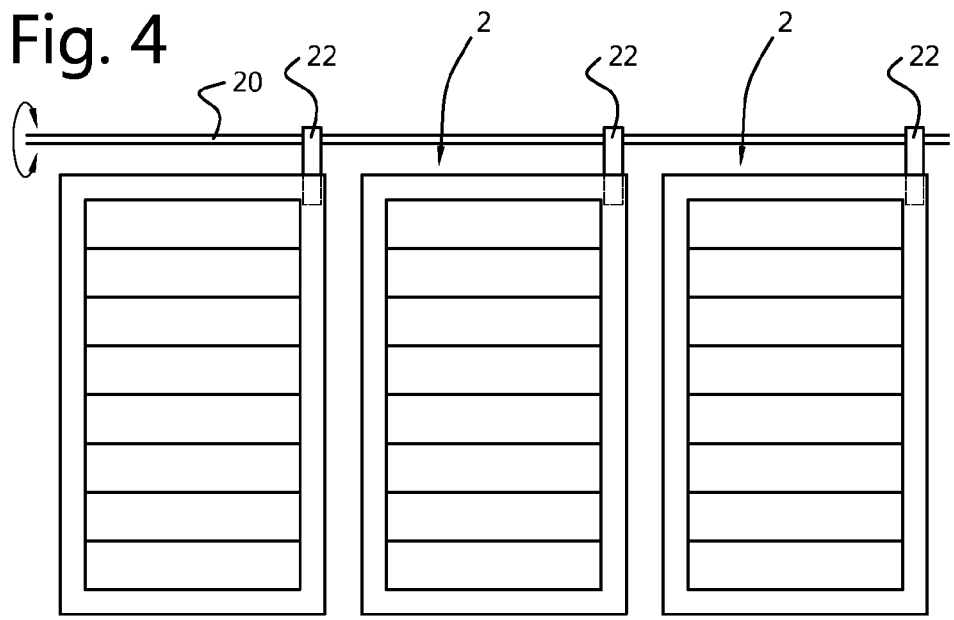
FIG. 4 illustrates schematically the use of a control shaft with an array of shutter panels.

FIG. 4 illustrated schematically an embodiment of the present invention in which a single control shaft 20 is operable to drive simultaneously the tilt mechanisms of each one of a plurality of shutter panels 2.

As illustrated, the control shaft 20 extends alongside each one of the plurality of shutter panels 2. In this way, it is able to interact with and drive the tilt mechanisms housed within each of the shutter panels 2. The control shaft 20, in other words, extends alongside the side-by-side arrangement of shutter panels 2.

The control shaft 20 may provide drive to the respective tilt mechanisms of the shutter panels 2 by itself moving in any effective manner, for example up/down, left/right or back/forward along its elongate length. However, in a preferred embodiment, as illustrated, the control shaft 20 is rotatable about an axis extending along its length.

The control shaft may be provided as a single integral unit or may be provided as a plurality of co-operating parts, optionally interlocking with each other. For example, each shutter panel 2 could have a respective sub-shaft or piece which co-operates and/or interlocks with the other sub-shafts or pieces to form the control shaft.

In the illustrated embodiment, the control shaft 20 extends above a horizontal side-by-side arrangement of shutter panels 2, but it could also be arranged below this arrangement. Also, for a vertical side-by-side arrangement of shutter panels, a control shaft could be arranged vertically on either the left or right side of the arrangement.

As illustrated, respective transfer mechanisms 22 are provided for transferring drive from the control shaft 20 to each respective one of the shutter panels 2.

Figure 5:
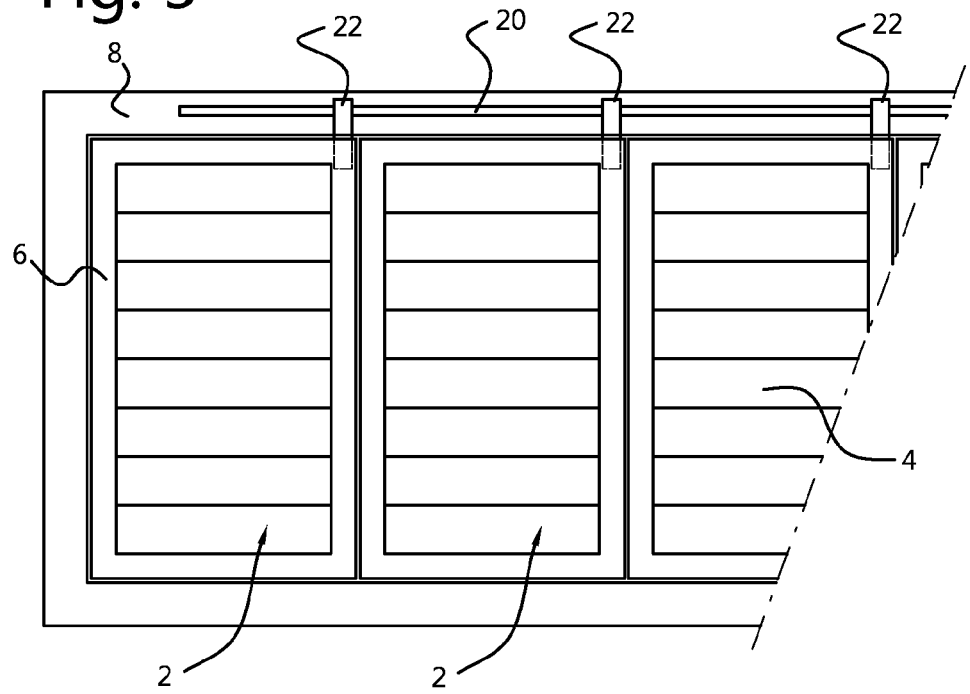
FIG. 5 illustrates the arrangement of a control shaft in a frame.

In accordance with the description of FIG. 2, the shutter panels 2 can be supported in a frame 8. With such an arrangement, the control shaft 20 may be housed within a portion of the frame 8, for example the upper portion as illustrated schematically in FIG. 5. Each transfer mechanism 22 may then extend between and be distributed across the interface between the frame 8 and the respective shutter panels 2.

In some embodiments, the control shaft 20 could be manually operated, for instance by means of a user-operable control rod or looped control cord or chain.

Figure 6:
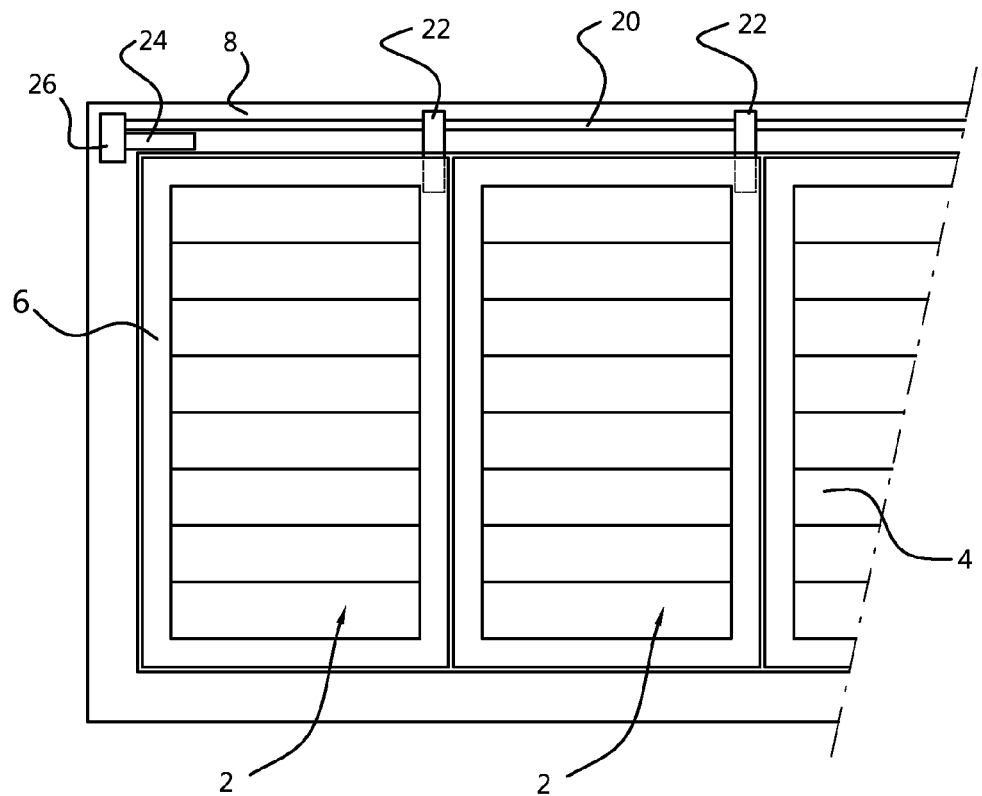
FIG. 6 illustrates the control shaft with a motor.

FIG. 6 illustrates schematically a preferred embodiment where a control motor 24 is additionally provided within the frame 8. This is a significant advantage over arrangements where individual respective motors are provided in each respective shutter panel.

A gear box 26 may be provided for transferring rotation of the motor 24 to movement of the control shaft. Where the control shaft rotates, it is possible that the gear box need only provide 0.5 revolutions for the control shaft.

As illustrated, the motor 24 is provided in the same portion of the frame 8 as the control shaft 20. It will be understood that, with an appropriate transfer mechanism, the control motor 24 could be provided in any other portion of the frame 8.

It should also be understood that the arrangement described with reference to FIG. 4 could also use a motor to operate the control shaft 20.

Figure 7A:
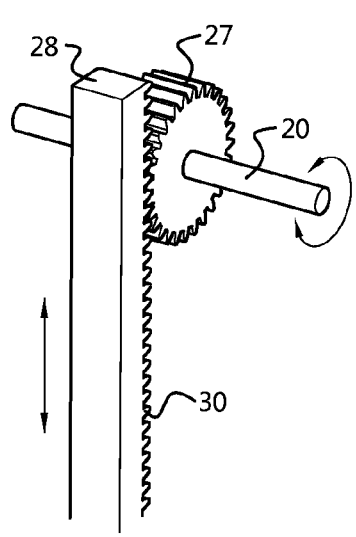
FIG. 7(a) illustrates part of a transfer mechanism.
Figure 7B:
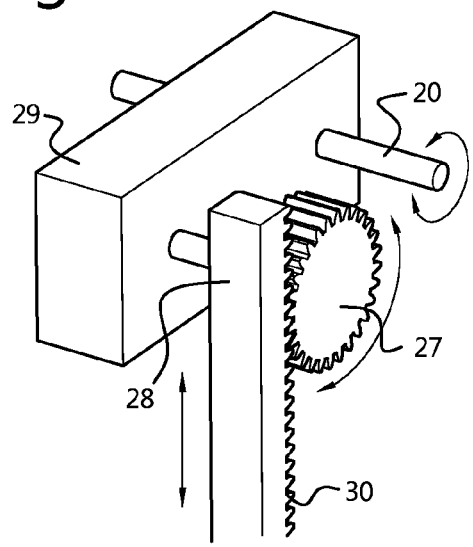
FIG. 7(b) illustrates a clutch device between the output of a control shaft and a respective transfer mechanism.

FIG. 7(*a*) illustrates a possible arrangement for each respective transfer mechanism 22. For each respective shutter panel 2, there is provided a pinion gear 27 rotatable with the control shaft 20. A respective actuator or actuator arm 28 engages with and is driven by the pinion gear 27 by virtue of a series of teeth 30 on one side of the actuator arm 28 transforming the actuator arm 28 into a rack. By rotating the control shaft 20 and pinion gear 27 in one direction or the opposite direction, it thus becomes possible to translate the actuator arm 28 up or down respectively. The actuator arm 28 drives a respective tilt mechanism so as to tilt the louvers 4 of a corresponding respective shutter panel 2.

FIG. 7(*b*) illustrates a development of the arrangement of FIG. 7(*a*) in which a clutch device 29 is provided between the pinion gear 27 and rotation of the control shaft 20. The clutch device 29 may selectively transfer rotation between the control shaft 20 and the pinion gear 27 or may allow relative rotation. In one example, the clutch may be an electromagnetic clutch which is controllable to selectively transfer rotation or allow relative slip. Where a motor is provided to drive the control shaft 20, the clutch device 29 may be controllable with the motor so that, when the motor is operated to rotate the control shaft 20, the clutch device 29 locks the rotation of the control shaft 20 to rotation of the pinion gear 27 and, when the motor is not operated, the pinion gear 27 is free to rotate relative to the control shaft 20. In this way, when the motor is not operated, a user may freely adjust the tilt of louvers manually. After a set of louvers has been tilted manually and then the motor and control shaft 20 is operated, in order to bring all of the louvers of the shutter panels back into alignment, the motor may operate the control shaft 20 beyond full tilt of the louvers so that the respective clutch devices 29 allow slip between the control shaft 20 and the louvers until the louvers of all the shutter panels are all aligned.

In certain embodiments, in particular where shutter panels are fixed within an architectural opening and manual operation of the louvers is not required, a respective actuator arm 28 can be formed integrally with the respective tilt mechanism, for example as an extension of part of the tilt mechanism, such as a rack bar 14 in the arrangement of FIG. 3.

For ease of assembly, it may be preferable for the actuator arm 28 and a portion of the tilt mechanism to be provided separately and engaged with one another during installation. There are also advantages in some arrangements for allowing the actuator arm 28 to engage and disengage with the tilt mechanism.

Figure 8:
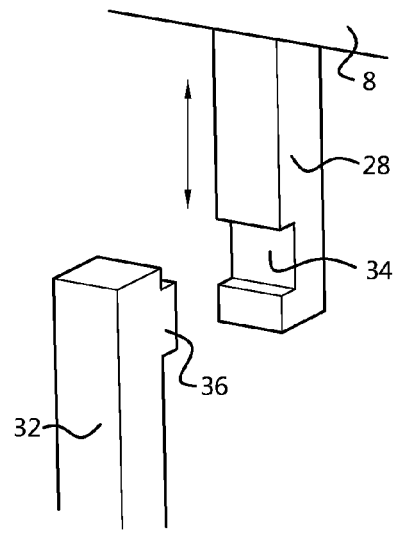
FIG. 8 illustrates a disengageable transfer mechanism.

FIG. 8 illustrates schematically an actuator arm 28 extending from a frame 8, together with a tab 32 extended from a respective tilt mechanism and for engagement with the actuator arm 28. A similar arrangement may be provided for the example of FIG. 4 where shutter panels are mounted directly in an architectural opening.

As illustrated, the actuator arm 28 includes a recess 34 and the extended tab 32 includes a corresponding respective protrusion 36. It will be appreciated that this arrangement can be reversed with a protrusion provided on the actuator arm 28 and the recess formed in the extended tab 32. The extended tab 32 engages with the actuator arm 28 by inserting the protrusion 36 into the recess 34. When rotation of the control shaft 20 causes the actuator arm 28 to translate up and down parallel with its longitudinal extent, engagement of the protrusion 36 in the recess 34 causes the extended tab 32 similarly to translate up and down and operate the respective tilt mechanism.

One or both of the actuator arm 28 and extended tab 32 may be configured to allow some movement away from each other, so as to allow the protrusion 36 to disengage from the recess 34. The mounting mechanism for one or both of the actuator arm 28 and extended tab 32 may allow for this relative movement and/or the components may have sufficient resilient qualities to provide this.

Figure 9A:
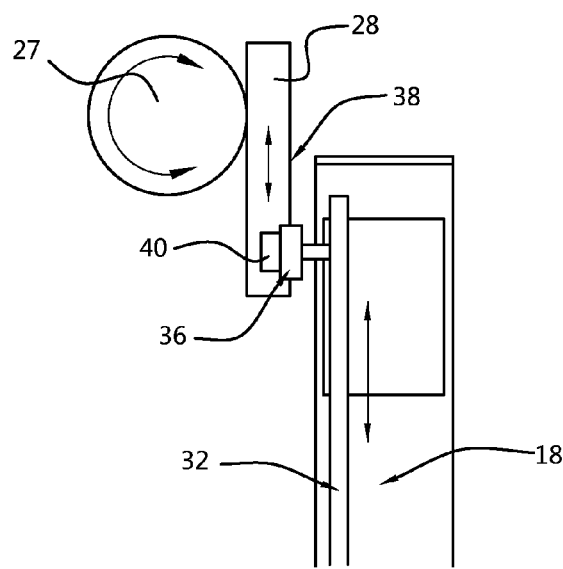
FIGS. 9(a) and (b) illustrate operation of a disengageable transfer mechanism.
Figure 9B:
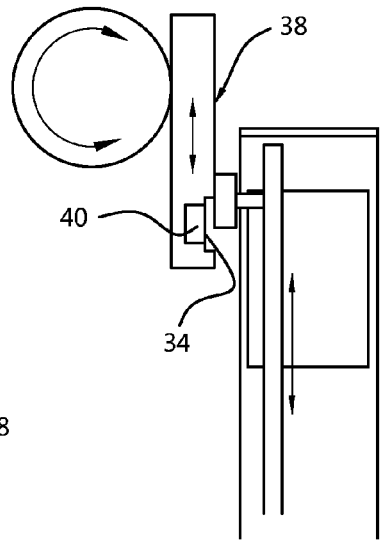

FIGS. 9(*a*) and 9(*b*) illustrate schematically the arrangement in an engaged and disengaged state respectively.

In the engaged state of FIG. 9(*a*), rotation of the control shaft 20 and the pinion gear 27 clockwise or anticlockwise will cause the actuator arm 28 to move downwards or upwards respectively. The protrusion 36 of the extended tab 32 engages in the recess of the actuator arm 28 and is similarly moved downwards or upwards respectively. In this way, the respective tilt mechanism is operated.

With this illustrated arrangement, the extended tab 32 can disengage from the actuator arm 28. This is useful for embodiments as described below with reference to FIGS. 10 and 11 where a shutter panel 2 is swung open. Also, once a sufficient force is applied to the extended tab 32, it may force the protrusion 36 and recess 34 to become disengaged from one another, eg by resiliently flexing away from one another, such that the extended tab 32 and corresponding respective tilt mechanism may operate independently of the control shaft 20. This allows a user manually to tilt a set of louvers 4 of a respective shutter panel 2 irrespective of use of the control shaft 20. As illustrated, the actuator arm 28 includes a surface 38 upon which the protrusion 36 can slide in the disengaged state as illustrated in FIG. 9(*b*).

In order for the control shaft 20 once again to regain control of all of the respective tilt mechanisms, it is sufficient to operate the control shaft 20 and all of the respective pinion gears 27 and actuator arms 28 between the full range of operation. In this way, all of the actuator arms 28 will inevitably re-engage with any of the extended tabs 32 which have been placed in a disengaged state as illustrated in FIG. 9(*b*).

Engagement between the actuator arm 28 and extended tab 32 may alternatively or additionally be achieved using one or more magnetic components. In the arrangement illustrated in FIGS. 9(*a*) and (*b*) a magnet 40 is provided at the base of the recess 34 and the protrusion 36 is formed from a magnet. One of these respective magnets could be replaced with a non-magnetised ferrous material.

The actuator arm 28 and extended tab 32 described above may not only form a respective connector connecting drive of the control shaft 20 to the respective tilt mechanism, but may also, with functions as described above for FIG. 7(*b*), provide a respective clutch allowing, where required, relative movement between the control shaft 20 and the tilt mechanism. The functions of the clutch could alternatively be provided at some other position between drive of the control shaft 20 and the tilt mechanism such as described with reference to FIG. 7(*b*) where a respective clutch is provided between each respective pinion gear 27 and the control shaft 20. In the clutch formed between the protrusion 36 and recess 34 as described with reference to FIGS. 8 and 9, engagement is provided at one position and slip is allowed in all other positions. It is also possible to provide a clutch where engagement is provided in all relative positions, but slip becomes possible in all of these relative positions once a required predetermined force is applied. To return to a state where the control shaft 20 has full control of all of the louvers of all of the shutter panels 2 in the same orientation, it would be sufficient for the control shaft 20 to rotate enough to tilt all of the louvers 4 from one extreme angle to the other. In this way, the respective sets of louvers 4 will be tilted until they reach their full angular tilt. Further rotation of the control shaft 20 will cause slip at the respective clutch for a set of louvers 4 that has reached its full tilt angle and remaining sets of louvers 4 will continue to tilt until they also reach their full tilt angle.

Figure 10:
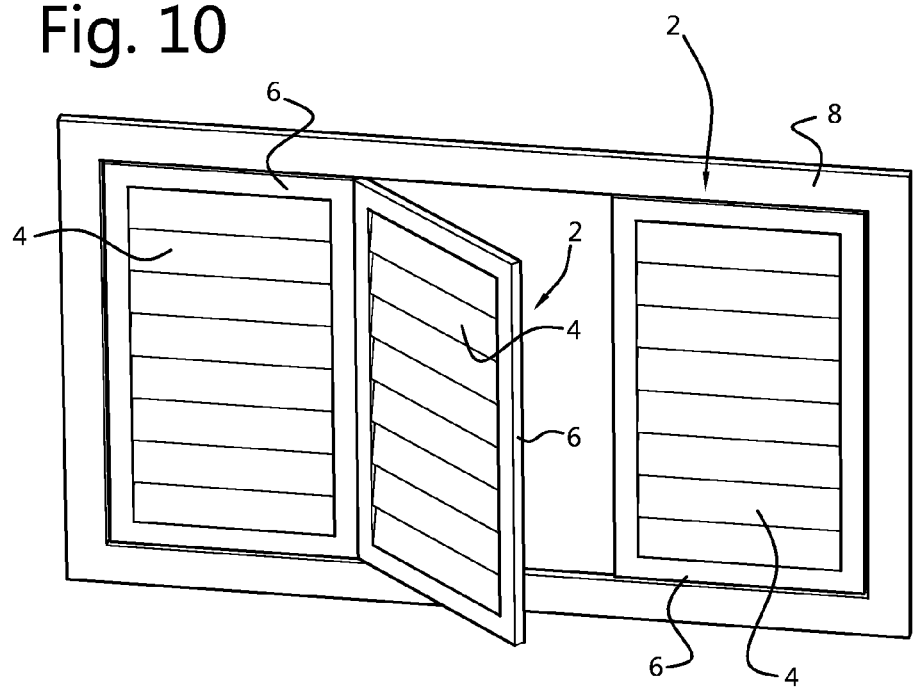
FIG. 10 illustrates a pivotably openable shutter panel.

It may be desirable for individual shutter panels 2 to be pivoted from the plane of their normally closed orientation, for example the plane of the frame 8, to an open position with that shutter panel 2 extending out of the plane. This is illustrated in FIG. 10. Although it would be possible to provide an actuator arm which translates along the pivot axis of a shutter panel 2 so that the control shaft 20 is able to operate the louvers 4 of a shutter panel 2 irrespective of its position (between closed and open positions), this may be an unnecessary level of complication noting that, usually, when a shutter panel 2 is open, a user will not require operation of the respective set of louvers by the control shaft 20.

Figure 11:
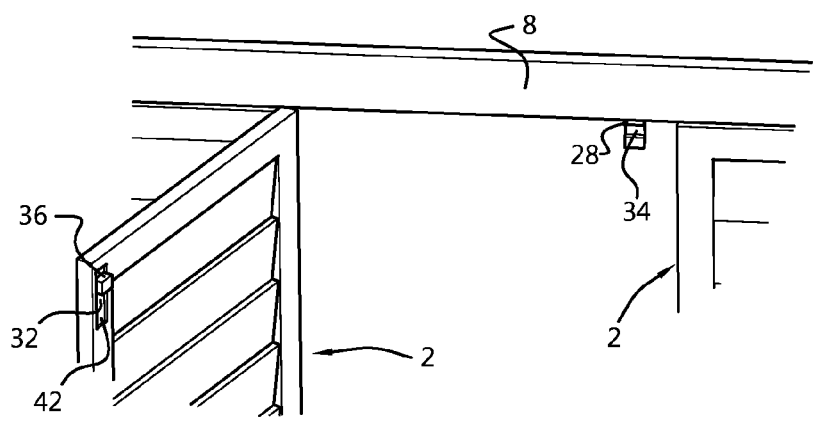
FIG. 11 illustrates a disengageable connector for an openable shutter panel.
Figure 12A:
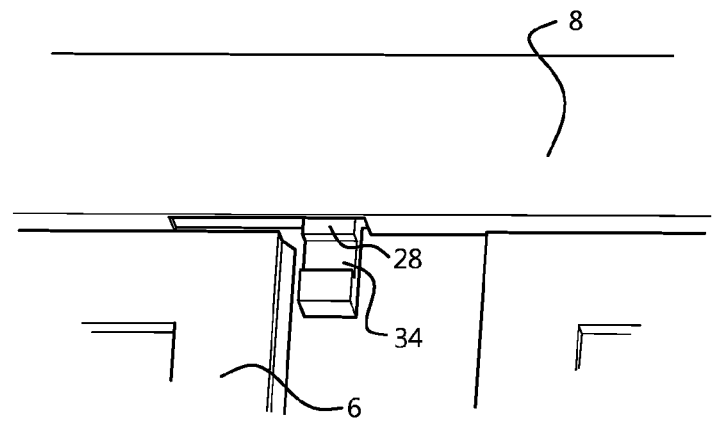
FIGS. 12(a) to (d) illustrate parts of a transfer mechanism.
Figure 12B:
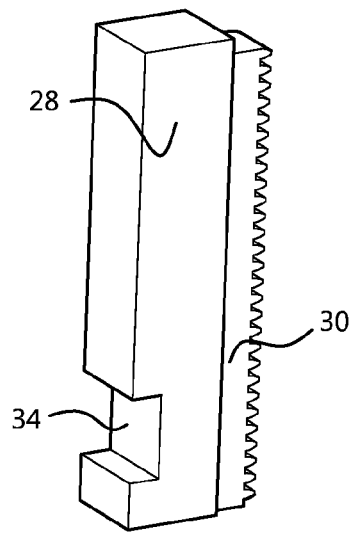
Figure 12C:
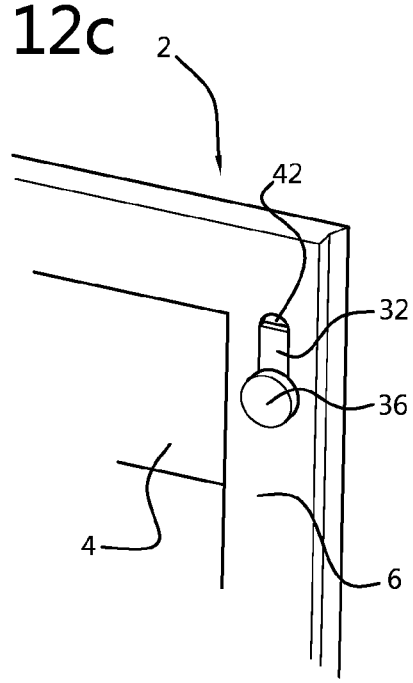
Figure 12D:
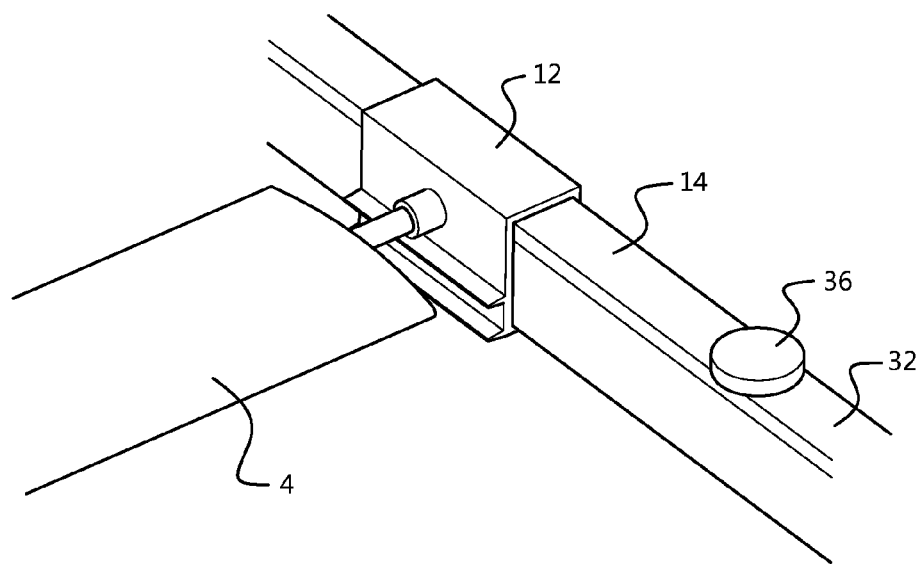

FIG. 11 illustrates an arrangement using a connection between an actuator arm 28 and an extended tab 32 similar to that described with reference to FIG. 8. In the illustrated arrangement, the extended tab 32 is housed within an edge member or stile 6 of the shutter panel 2. The edge member 6 defines an elongate aperture 42 through which the protrusion 36 extends. The protrusion 36 of the extended tab 32 is able to move up and down along the extent of the aperture 42 so as to operate the tilt mechanism housed within the shutter panel 2. When the shutter panel 2 is pivoted to its closed position, the protrusion 36 swings into engagement with the recess 34 of the actuator arm 28. In particular, movement of the shutter panel 2 immediately into or out of its closed position is substantially parallel with the axis of protrusion between the protrusion 36 and recess 34. In the manner described above, if the protrusion 36 happens to be out of alignment with the recess 34, operation of the control shaft 20 between its full opposite rotational positions will cause the protrusion 36 to become engaged in the recess 34. The arrangement may additionally provide the feature of a clutch allowing a user to manually operate a set of louvers 4 irrespective of the control shaft 20 or, alternatively, the arrangement may be intended merely to re-engage the protrusion 36 of the extended tab 32 with the recess 34 of the actuator arm 28.

In the illustrated arrangement, the transfer mechanism formed by the actuator arm 28 and extended tab 32 is provided at a portion distant from the pivot of the shutter panel 2. In this way, the extended tab 32 and actuator arm 28 become disengaged with only a small angular opening of the shutter panel 2. Arrangements are possible with the transfer mechanism located closer to the pivot of the shutter panel 2, but larger opening angles may be required to ensure full disengagement.

FIGS. 12(*a*) to (*d*) illustrate an example of a practical arrangement of a transfer mechanism 22 providing the features of connector and clutch described above.

The invention claimed is:

1. A shutter assembly comprising:
    a plurality of shutter panels arranged side-by-side, each shutter panel including a respective plurality of louvers and a respective operable tilt mechanism configured to adjust the tilt angle of the respective plurality of louvers; and
    a control shaft for operating the tilt mechanisms; wherein:
    the control shaft is configured to drive simultaneously the respective tilt mechanisms of all of the plurality of shutter panels; and
    the respective tilt mechanism of at least one shutter panel of the plurality of shutter panels is operable independently of the control shaft by disengaging the tilt mechanism from the control shaft.

2. A shutter assembly according to claim 1 further comprising a plurality of respective actuators for the plurality of respective shutter panels, each respective actuator operatively engageable with the respective tilt mechanism and all of the respective actuators operable by the control shaft to drive the respective tilt mechanisms.

3. A shutter assembly according to claim 2 further comprising a plurality of respective gear mechanisms for converting rotational movement of the control shaft to translation of respective actuators.

4. A shutter assembly according to claim 2 wherein each respective actuator extends towards the respective shutter panel and is configured to translate parallel to a plane defined by the respective shutter panel and thereby drive the respective tilt mechanism.

5. A shutter assembly according to claim 2 wherein a respective tab of each respective tilt mechanism of each respective shutter panel extends towards a respective actuator for engagement therewith and is operable by the respective actuator to drive the respective tilt mechanism.

6. A shutter assembly according to claim 2 further comprising one or both of: a plurality of respective clutches between respective actuators and the control shaft; and a plurality of respective clutches forming respective engagements between the respective tilt mechanisms and the respective actuators, each respective clutch allowing relative slip between the respective tilt mechanism and the respective actuator once a breakaway resistance has been overcome.

7. A shutter assembly according to claim 6 wherein each respective clutch or engagement or both includes at least one of a mechanical engagement, a magnetic engagement and an electro-magnetic engagement.

8. A shutter assembly according to claim 2 further comprising a frame supporting the plurality of shutter panels.

9. A shutter assembly according to claim 8 wherein the control shaft extends within a portion of the frame.

10. A shutter assembly according to claim 8 wherein the actuators extend from the frame towards the respective shutter panels.

11. A shutter assembly according to claim 1 further comprising a plurality of respective clutches formed between the respective tilt mechanisms and the control shaft, each respective clutch allowing relative slip between the respective tilt mechanism and the control shaft.

12. A shutter assembly according to claim 1 wherein at least one shutter panel of the plurality of shutter panels is pivotably supported and is pivotable from a closed position in which the at least one shutter panel defines a plane and an open position in which the at least one shutter panel at least partially extends from the plane; and wherein, when the at least one shutter panel is in a position pivoted from the closed position, the respective tilt mechanism of the at least one shutter panel is pivoted away from the control shaft so that the respective tilt mechanism of the at least one shutter panel is disengaged from the control shaft.

13. A shutter assembly according to claim 12 wherein each respective shutter panel has a respective connector configured to operably connect drive of the control shaft to the respective tilt mechanism when the respective shutter panel is in the closed position and configured to disconnect drive of the control shaft to the respective tilt mechanism when the respective shutter panel is in a position pivoted away from the closed position.

14. A shutter assembly according to claim 13 wherein each respective connector includes one or both of a mechanical engagement and a magnetic engagement.

15. A shutter assembly according to claim 1 further comprising a motor configured to rotate the control shaft.

16. A shutter assembly according to claim 15 wherein the motor is housed within the portion of the frame.

17. A shutter assembly according to claim 1 wherein each louver is tiltable about a respective longitudinal axis extending longitudinally along the louver and the louvers of a respective plurality of louvers are arranged in a side-by-side array with the respective longitudinal axes parallel.

18. A shutter assembly according to claim 17 wherein each respective louver includes, at one longitudinal end of the respective louver, a respective louver gear rotatable with the respective louver about the respective longitudinal axis of the louver for tilting the louver and wherein each respective tilt mechanism includes a rack bar extending substantially perpendicular to the louvers of the respective plurality of louvers and engaging with the respective louver gears of the respective plurality of louvers such that the louvers of the respective plurality of louvers tilt together.

19. A shutter assembly according to claim 1 wherein each respective shutter panel of the plurality of shutter panels includes a respective edge member and the respective tilt mechanism of the respective shutter panel is housed within the respective edge member.

20. A shutter assembly according to claim 1, wherein the respective tilt mechanism of the at least one shutter panel is operable independently of the control shaft by pivoting the tilt mechanism away from the control shaft.

21. A shutter assembly comprising:
a plurality of shutter panels arranged side-by-side, each shutter panel including a plurality of louvers and a tilt mechanism configured to adjust the tilt angle of the plurality of louvers; and
a control shaft for operating the tilt mechanisms of the plurality of shutter panels; wherein:
the control shaft is configured to drive simultaneously the tilt mechanisms of all of the plurality of shutter panels; and
a shutter panel of the plurality of shutter panels is pivotable out of a plane defined by other shutter panels of the plurality of shutter panels to disengage the tilt mechanism of the at least one shutter panel from the control shaft.

22. A shutter assembly comprising:
a plurality of shutter panels arranged side-by-side, each shutter panel including a plurality of louvers and a tilt mechanism arranged to adjust the tilt angle of the plurality of louvers; and
a control shaft for operating the tilt mechanisms;
wherein:
the control shaft is arranged to simultaneously drive each tilt mechanism of each plurality of shutter panels;
the tilt mechanism of at least one shutter panel of the plurality of shutter panels is operable independently of the control shaft;
the at least one shutter panel is pivotable between a closed position and an open position; and
when the at least one shutter panel is in a position pivoted from the closed position, the tilt mechanism of the at least one shutter panel is pivoted away from the control shaft to disengage the tilt mechanism of the at least one shutter panel from the control shaft.

23. A shutter assembly according to claim 22, wherein:
in the closed position, the at least one shutter panel defines a plane; and
in the open position, the at least one shutter panel at least partially extends from the plane.

* * * * *